United States Patent [19]

Daby

[11] 4,312,463
[45] Jan. 26, 1982

[54] PROPORTIONAL PUMPING APPARATUS

[76] Inventor: Lance H. Daby, 12202 Woodbine, Detroit, Mich. 48239

[21] Appl. No.: 118,500

[22] Filed: Feb. 4, 1980

[51] Int. Cl.³ .................. B67D 5/56; B67D 5/52; F04B 23/06
[52] U.S. Cl. .................. 222/134; 417/429; 60/579; 60/581; 222/135
[58] Field of Search .................. 222/134, 135; 60/579, 60/581, 594; 417/342, 429, 382, 390

[56] References Cited

U.S. PATENT DOCUMENTS

| 646,316 | 3/1900 | Ross | 222/134 X |
| 2,946,488 | 7/1940 | Kraft | 222/134 |
| 3,207,378 | 9/1965 | Trumbell et al. | 222/134 |
| 3,474,965 | 10/1969 | Coleman | 222/134 |
| 3,610,783 | 10/1971 | Crouchen | 417/390 |
| 3,642,175 | 2/1972 | Robbins | 222/135 |

Primary Examiner—Richard E. Gluck
Attorney, Agent, or Firm—Charles W. Chandler

[57] ABSTRACT

Apparatus for delivering highly viscous liquids from a pair of containers for mixing together, including a metering pump mounted on each of the containers, an air motor connected to one of the metering pumps, a master hydraulic cylinder connected to the air motor and a slave hydraulic cylinder connected to the other metering pump such that as the air motor drives one of the metering pumps in a stroke, the hydraulic cylinders move the other metering pump in its stroke.

5 Claims, 3 Drawing Figures

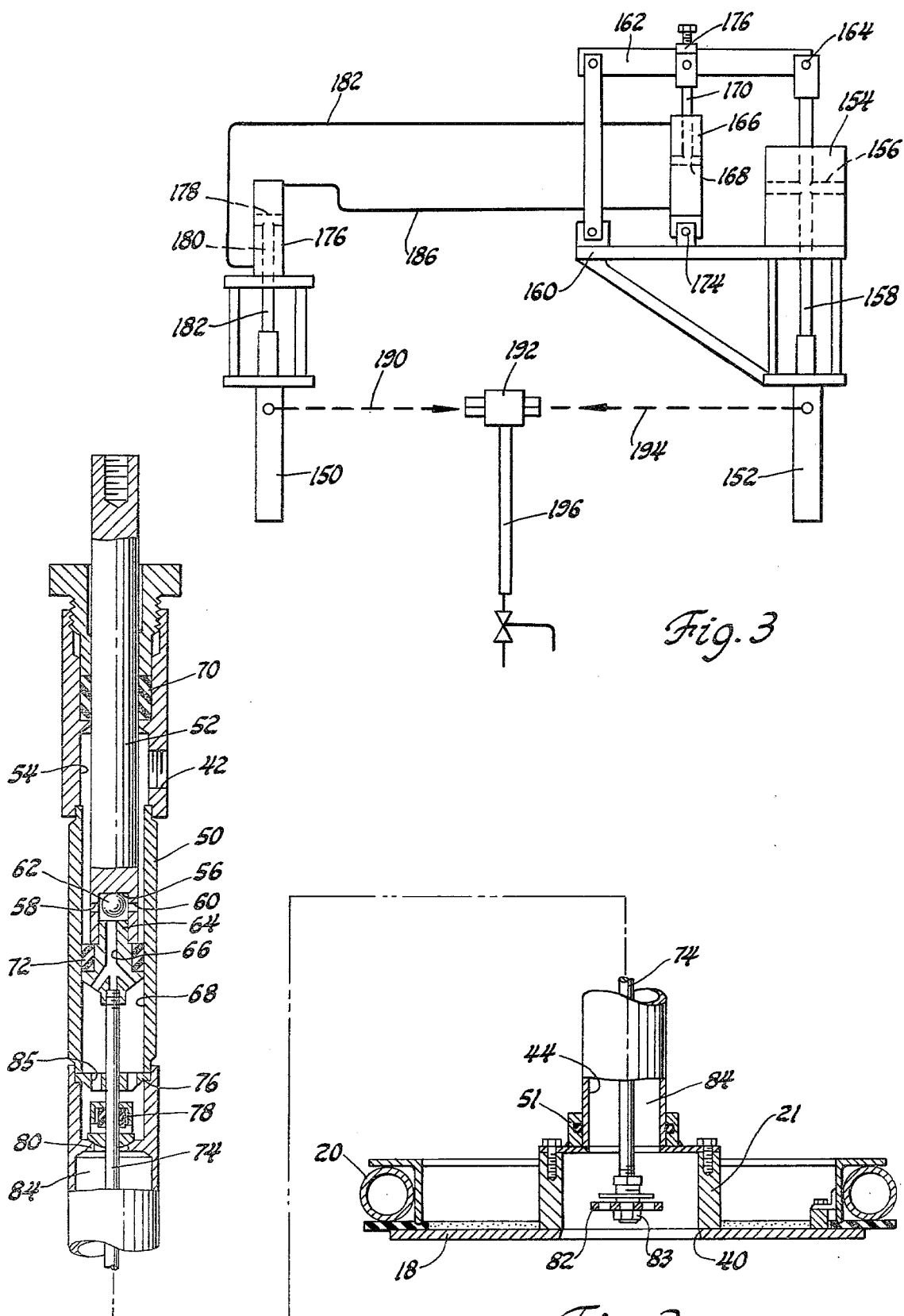

PROPORTIONAL PUMPING APPARATUS

BACKGROUND OF THE INVENTION

This invention is related to apparatus for delivering at least two highly viscous fluids in predetermined proportions from their respective containers for mixing together, and more particularly to such apparatus in which both metering pumps are actuated by a single air motor and connected by a hydraulic master and slave cylinder means until such that the two metering pumps deliver liquids from their containers simultaneously.

Certain industries employ highly viscous materials such as silicones, polysulphides, epoxies, and urethane materials in a process in which two very viscous liquids are mixed together. The two materials are usually supplied in their own containers. Conventional practice is to employ a feed pump that is mounted on each container, frequently on a follow plate which has a size corresponding to the open top of the container. A ram then forces the follow plate and the feed pump into the container. The liquid is received into the feed pump which, powered by its air motor, delivers a substantially continuous flow to a metering pump. Each liquid is received by its respective metering pump. The two metering pumps then deliver the liquids to a mixing device, the two metering pumps being powered by a third reciprocating air motor.

SUMMARY OF THE INVENTION

The broad purpose of the present invention is to provide apparatus for mixing two highly viscous materials together from two containers in which each metering pump is mounted directly on its respective container, an air motor is drivingly connected to one of the metering pumps, and a master and slave hydraulic cylinder means connect the two metering pumps such that as the first metering pump is moved in its stroke by the air motor, the second metering pump is simultaneously moved in its stroke. Thus the two liquids are removed from their respective containers by employing a single air motor.

A lever is employed in another embodiment of the invention and is so connected to the air motor that by adjusting the position of the master hydraulic cylinder on the lever, the ratio of the volume being delivered from the two containers can be adjusted.

The preferred system eliminates the use of conventional feed pumps or other pressure feed devices for supplying fluid to the metering pumps since the metering pumps have their inlet directly connected to the containers from which the liquids are being delivered.

The preferred system costs less than a conventional system since fewer components are necessary. Less maintenance is necessary since there is only one pump for each liquid rather than a feed pump and a metering pump as in conventional systems. The preferred system employs little floor space and is easier to operate since the operator needs only to adjust one air motor instead of three motors as in a conventional system.

Still further objects and advantages of the present invention will become readily apparent to those skilled in the art to which the invention pertains upon reference to the following detailed description.

DESCRIPTION OF THE DRAWINGS

The description refers to the accompanying drawing in which like reference characters refer to like parts throughout the several views, and in which:

FIG. 2 is a longitudinal sectional view of a typical metering pump; and

FIG. 3 is a view showing another embodiment of the invention employing a lever for adjusting the delivery ratio of the two liquids.

DESCRIPTION OF THE PREFERRED EMBODIMENT

Figure 1:
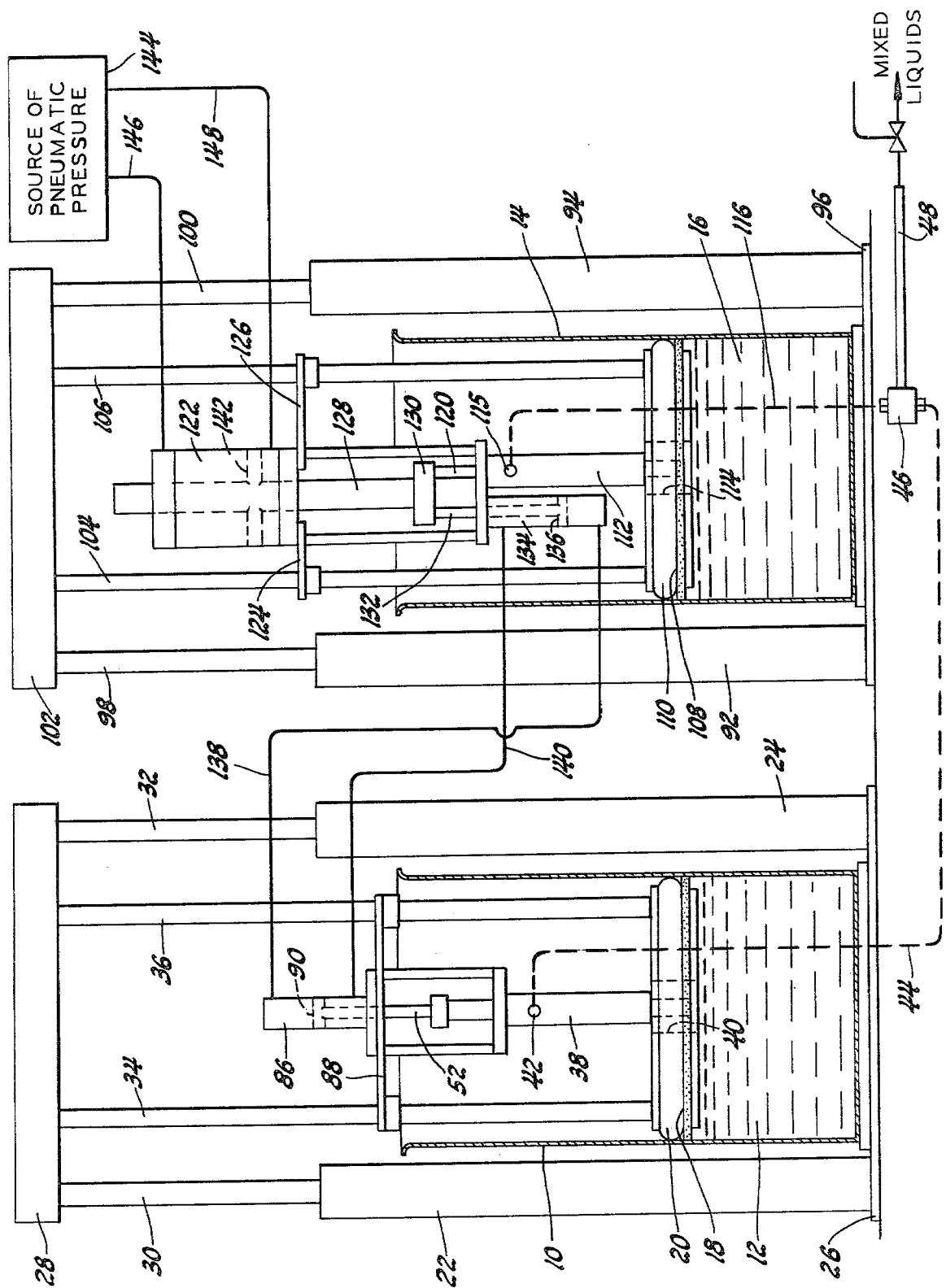
FIG. 1 is a diagrammatic view illustrating the preferred apparatus.

Referring to the drawings, a first drum 10 is illustrated as containing a high viscous liquid 12. A second drum 14 contains a high viscous liquid 16. The liquids each have a highly viscous character such as a catalyst and a resin employed to be mixed together as an epoxy. Both drums have an open top.

Referring to FIG. 2, a follow plate 18 is disposed in drum 10. Plate 18 has an annular retainer 19 supporting a tubular seal 20 which engages the drum surfaces as the follow plate is lowered into the drum. Plate 18 has a hub 21.

A pair of pneumatic rams 22 and 24 are anchored on opposite sides of the drum to a plate 26 on which the drum is mounted. A cross member 28 is carried on piston rods 30 and 32 of the two rams 22 and 24, respectively. A pair of legs 34 and 36 depend from cross member 28 and have their lower ends connected to the follow plate such that as piston rods 30 and 32 are retracted, the follow plate is urged down into the drum.

A metering pump 38 is mounted on the follow plate. Plate 18 and hub 21 have an inlet 40 for receiving liquid from drum 10 into pump 38. The pump has an outlet 42 for discharging such liquid through a conduit 44 to a conventional mixing device 46. A conduit 48 delivers the mixed fluids to any suitable process.

Pump 38 is of the reciprocating double-acting type and, as illustrated in FIG. 2, includes a tubular housing 50 connected by means 51 to the follow plate. A rod 52 has its lower end received in housing 50 and disposed in pumping chamber 54 having a diameter greater then that of the rod. Outlet 42 communicates with chamber 54.

The lower end of the rod has a hollow section 56 with a pair of radial openings 58 and 60. A ball check valve 62 is disposed in hollow section 56. An annular valve seat 64 is adapted to sealingly receive valve 62. Valve seat 64 also have a longitudinal passage 66 communicating with a lower chamber 68.

Seal means 70 carried within the cylinder sealingly engage rod 52 above outlet 42.

A second seal means 72 is carried by valve seat 64 to slidably engage the interior wall of housing 50.

Passage 66 provides communication between the lower end of chamber 54, hollow section 56 of the rod, and lower chamber 68.

A second rod 74 is carried at the lower end of rod 52. A guide member 76 guides rod 74 for reciprocating motion.

A check valve member 78 is slidably carried on rod 74 and is seated on an annular seat 80 carried within housing 50.

A priming piston 82 and fastener 83 are carried on the lower end of rod 74. The stroke of rod 52 is such that priming piston 82, in its lower position, extends into hub 21. In its upper position, piston 82 is received into priming chamber 84.

In operation, rod 52 is vertically reciprocated within housing 50. During the rods downward stroke, valve 78 is closed to block flow through seat 80, and valve 62 is open to permit flow through seat 64. As rod 52 is raised, valve 62 closes against seat 64 causing liquid in chamber 54 to be pumped out outlet 42. As rod 52 is raised, rod 74 is also raised, causing valve 78 to lift off seat 80. Valve 78 raises with rod 74 until it contacts guide 76 whereafter rod 74 slides through valve 78. As rods 52 and 74 raise, priming piston 82 raises, urging liquid upwardly through valve seat 80 and opening 85 into chamber 68. As the rod is reciprocated downwardly, valve 78 is seated to close the opening in valve seat 80. Ball check valve 62 is unseated so that the liquid in lower chamber 68 passes through passage 66 and out through openings 58 and 60 into pumping chamber 54. Liquid already in chamber 54 is forced out outlet 42 in an amount equal to the volume of rod 52 which enters chamber 68 minus the volume of rod 74 which exits chamber 68 during the down stroke.

On the next upward stroke of rod 52, ball 62 is closed by virtue of the liquid contained in the pumping chamber so that the liquid in the upper end of the pumping chamber passes out through outlet 42. The arrangement is such that even though rod 52 is moved in a reciprocating motion, there is substantially a continuous flow from container 10 into conduit 44.

Referring to FIG. 1, a slave hydraulic cylinder 86 is mounted on a cross-member 88 which has its ends carried on legs 34 and 36. A piston 90, carried within slave cylinder 86 is connected to rod 52 so that it and piston 90 reciprocate together.

A second pair of pneumatic rams 92 and 94 are mounted on opposite sides of base plate 96, illustrated in FIG. 1. Drum 14 is disposed between rams 92 and 94. Rams 92 and 94 have piston rods 98 and 100, respectively.

Legs 104 and 106 depend from cross-member 102 and support a follow plate 108 which is received in the open top of drum 14. Follow plate 108 carries a tubular seal 110 which slides along the inner surface of the drum.

A metering pump 112 is mounted on a follow plate 108, which is constructed with an inlet opening 114 in a manner identical to follow plate 108. Opening 114 provides means for receiving liquid 16 into pump 112. Pump 112 is identical in construction to pump 38 and has outlet 115 for delivering liquid to conduit 116 which is connected to mixing device 46.

Pump 112 has a rod 120 connected to an air motor 122, mounted on supports 124 and 126. Motor 122 has a piston rod 128 connected to cross bar 130 which is attached to metering pump rod 120 and also to a piston rod 132 of a master hydraulic cylinder 134. Rod 132 is connected to a reciprocating piston 136 carried in cylinder 134.

A hydraulic conduit 138 connects the lower end of the master cylinder to the upper end of the slave cylinder, while a second conduit 140 connects the upper end of the master cylinder to the lower end of the slave cylinder. The arrangement is such that as the piston rod in the master cylinder is lowered, it forces hydraulic fluid into the upper end of the slave cylinder to cause the slave piston 90 to be lowered a corresponding distance. Similarly, as the piston in the master cylinder is raised, it forces fluid into the lower end of the slave cylinder causing slave piston 90 to be raised a corresponding distance.

Air motor 122 has a piston 142 reciprocally connected to rod 128. A source of pneumatic pressure 144 has a fluid conduit 146 pneumatically connected to the upper end of the air motor, and a second conduit 148 pneumatically connected to the lower end of the air motor.

In operation, the two drums of liquid 10 and 14, are mounted on plates 26 and 96. Follow plate 18 is then mounted in the open top of drum 10 and follow plate 108 is mounted in the open top of drum 14. This procedure is accomplished by appropriately operating pneumatic rams 22, 24, 92, and 94. The rams are then further lowered so that the liquid in the two drums is discharged to prime their respective metering pumps. Air motor 122 is operated to actuate metering pump 112 to pump liquid from drum 14 to the mixer 46. As air motor piston 142 is lowered to operate metering pump 112, it simultaneously causes the master cylinder to operate the slave cylinder such that metering pump 38 is operated concurrently with metering pump 112. This arrangement illustrates a one to one discharge from the two pumps, that is the amount of liquid discharged from drum 14 is the same as the amount of liquid discharged from drum 10.

FIG. 3 illustrates a variable ratio system. In this arrangement, the drums and the follow plates have been omitted to schematically show the system. A metering pump 150 is employed to deliver liquid from a first drum (not illustrated) while a second metering pump 152 is employed to deliver liquid from a second drum (not illustrated). Air motor 154 has a piston 156 connected to rod 158 of metering pump 152, such that as air motor piston 156 is reciprocated, it operates metering pump 152 to deliver liquid from its drum.

Air motor 154 is adjustably mounted on a support plate 160. A lever 162 has one end connected to upper end of the air motor piston rod by pin means 164. A master cylinder 166 has a piston 168 with a rod 170 connected to the lever 162 by connector means 172. The lower end of the master cylinder is connected to pivot means 174. The arrangement is such that the connection between the master cylinder piston rod and the lever can be adjusted along the length of the lever such that it has a minimum stroke adjacent the left end of the lever and a maximum stroke when the connection is near the pivot means 164.

A slave cylinder 176 has a piston 178 with a rod 180 operatively connected to the rod 182 of metering pump 150. A fluid conduit 184 connects the upper end of the master cylinder to the lower end of the slave cylinder, and a second conduit 186 connects the lower end of the master cylinder to the upper end of the slave cylinder so that as the piston in the master cylinder is lowered, it delivers fluid to the upper end of the slave cylinder to cause the piston in the slave cylinder to be lowered accordingly. Similarly, as the piston in the master cylinder is raised, it causes the piston in the slave cylinder to be concurrently raised. The arrangement is such that the user can adjust the ratio between the stroke of the metering pump 152 and the metering pump 150 by adjusting fastener means 172 along the length of the lever along plate 160. The output of metering pump 150 is through a conduit 190 to a mixer 192 while the output of metering pump 152 is through a conduit 194 to the mixer so that the output 196 of the mixer is a mixed combination of the two liquids. This permits the user to deliver more liquid from one drum than from the other drum which is frequently desired for mixing a variety of highly viscous liquids. Thus, it is to be understood that I have described a system for delivering two highly viscous liquids from two drums of the liquids to a mixing device.

The system eliminates the feed pumps that are conventionally mounted on top of the drum to deliver material to metering pumps.

Having described my invention, I claim:

1. Proportioning apparatus comprising:
   a first container of a first liquid and a second container of a second liquid;
   first pump means for receiving the first liquid from the first container, said first pump means having a first movable pumping member;
   second pump means for receiving the second liquid from the second container, said second pump means having a second movable pumping member, the first pumping member being movable in a first stroke and the second pumping member being movable in a second stroke;
   a motor connected to the first pumping member for moving same in said first stroke;
   a master hydraulic cylinder connected to the motor, and a piston disposed in the master hydraulic cylinder so as to be actuated in a driving motion according to the motion of the first pumping member;
   a slave hydraulic cylinder, and a piston in the slave hydraulic cylinder connected to the second pumping member so as to be movable therewith;
   conduit means including hydraulic fluid connecting the master hydraulic cylinder and the slave hydraulic cylinder such that the piston of the slave hydraulic cylinder is moved according to the motion of the piston in the master hydraulic cylinder; and
   mixer means for receiving the first liquid from the first container and the second liquid from the second container as the motor is actuated to simultaneously remove the first liquid from the container of said first liquid and the second liquid from the container of said second liquid.

2. Apparatus as defined in claim 1, in which the first container has a top opening, and including a follow plate disposed in said top opening and connected to the first pump means, and including ram means connected to the follow plate to urge it into the container such that the first pump means is disposed to receive liquid from the first container as the plate is being received therein.

3. Apparatus as defined in claim 2, in which the second container has a top opening, and including a second follow plate disposed in the opening of the second container, and second ram means connected to the second follow plate to urge it into the container such that the second pump means is disposed to receive liquid from the second container as the second follow plate is being received therein.

4. Apparatus as defined in claim 3, including seal means carried about each of said follow plates for engaging the internal sides of the containers.

5. Apparatus as defined in claim 1, including a fulcrum member connected to the motor so as to be movable therewith, means for connecting the master cylinder to the fulcrum in a selected position such that the master cylinder has a stroke depending upon the position of the connecting means on the fulcrum, and the piston of the slave cylinder having a stroke corresponding to that of the piston of the master cylinder whereby the ratio of the liquid delivered from the first container and the second container is in accordance with the position of the connecting means to the fulcrum.

* * * * *